(12) United States Patent
Schultz

(10) Patent No.: US 6,286,076 B1
(45) Date of Patent: Sep. 4, 2001

(54) HIGH SPEED MEMORY-BASED BUFFER AND SYSTEM AND METHOD FOR USE THEREOF

(75) Inventor: Jürgen M. Schultz, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/225,983

(22) Filed: Jan. 5, 1999

(51) Int. Cl.[7] .................................................. G06F 12/00
(52) U.S. Cl. ...................... 711/101; 711/104; 711/108; 711/154
(58) Field of Search ................. 710/57; 711/101, 711/104, 105, 108, 154

(56) References Cited

U.S. PATENT DOCUMENTS

| | | | |
|---|---|---|---|
| 4,616,338 | 10/1986 | Helen et al. ............................ | 710/53 |
| 4,628,477 | * 12/1986 | Burrows ................................. | 711/219 |
| 4,833,655 | * 5/1989 | Wolf et al. ............................ | 365/221 |
| 5,032,985 | * 7/1991 | Curran et al. ......................... | 711/124 |
| 5,325,487 | 6/1994 | Au et al. ................................ | 711/131 |
| 5,406,554 | 4/1995 | Parry ...................................... | 370/381 |
| 5,546,347 | 8/1996 | Ko et al. ................................ | 365/221 |
| 5,717,647 | 2/1998 | Hush et al. ....................... | 365/230.05 |
| 5,898,315 | * 4/1999 | Knaack ................................... | 326/17 |

FOREIGN PATENT DOCUMENTS 0 272 869 6/1988 (EP).
0 292 287 11/1988 (EP).

OTHER PUBLICATIONS

European Search Report for Application No. EP 00 30 0019, mailed Apr. 26, 2000.
Texas Instruments Incorporated, "SN74ACT2227, SN74ACT2229 DUAL 64 x 1, DUAL 256 x 1 First-In, First-Out Memories," SCAS220C—Jun. 1992—Revised Oct. 1997, pp. 1–13.
Texas Instruments Incorporated, "SN74AL S235 64 x 5 Asynchronous First-In, First-Out Memory," SDAS108A—Oct. 1986—Revised Sep. 1993, pp. 1–15.
Texas Instruments Incorporated, "SN74ABT3614 64 x 36 x 2 Clocked Bidirectional First-In, First-Out Memory with Bus Matching and Byte Swapping," SCBS126G—Jun. 1992—Revised Apr. 1998, pp. 1–41.

* cited by examiner

*Primary Examiner*—Reginald G. Bragdon
(74) *Attorney, Agent, or Firm*—Conley, Rose & Tayon, PC; Lawrence J. Merkel

(57) ABSTRACT

A buffer configured to store a plurality of data entries comprises a memory, one or more registers coupled between an output of the memory and an output of the buffer, and control logic coupled to the registers and to the memory. The memory and the registers each store data entries in data entry storage locations. The registers may be coupled in a series-type configuration, and may be coupled to receive an output of the memory as an input.

31 Claims, 9 Drawing Sheets

| CLOCK CYCLE | 1 | 2 | 3 | 4 | 5 | 6 | 7 | 8 | 9 | 10 | 11 |
|---|---|---|---|---|---|---|---|---|---|---|---|
| READ | - | R | R | - | R | R | - | R | R | R | - |
| WRITE | W | W | W | W | W | W | W | - | - | - | - |
| DATA_IN | D0 | D1 | D2 | D3 | D4 | D5 | D6 | - | - | - | - |
| DATA_OUT | - | D0 | D1 | D2 | D2 | D3 | D4 | D4 | D5 | D6 | - |
| REG0 | - | D0 | D1 | D2 | D2 | D3 | D4 | D4 | D5 | D6 | - |
| REG1 | - | - | - | - | D3 | D4 | D5 | D5 | - | - | - |
| MEM0 | - | - | - | - | - | - | - | D6 | D6 | - | - |
| MEM1 | - | - | - | - | - | - | - | - | - | - | - |
| STATE | REG0EMPTY | REG0FULL | REG0FULL | REG0FULL | REG1FULL | REG1FULL | REG1FULL | MEMSTART | BYPASSREG1 | REG0FULL | REG0EMPTY |
| READ POINTER | MEM0 | MEM0 | MEM0 | MEM0 | MEM0 | MEM0 | MEM0 | MEM0+ | MEM1 | MEM1 | MEM1 |
| WRITE POINTER | MEM0 | MEM0 | MEM0 | MEM0 | MEM0 | MEM0 | MEM0+ | MEM1 | MEM1 | MEM1 | MEM1 |

| CLOCK CYCLE | 1 | 2 | 3 | 4 | 5 | 6 | 7 | 8 | 9 |
|---|---|---|---|---|---|---|---|---|---|
| READ | - | - | R | R | R | R | - | - | - |
| WRITE | W | W | - | - | - | - | W | W | - |
| DATA_IN | D3 | D4 | - | - | - | - | D5 | D6 | - |
| DATA_OUT | D0 | D0 | D0 | D1 | D2 | D3 | D4 | D4 | D4 |
| REG0 | D0 | D0 | D0 | D1 | D2 | D3 | D4 | D4 | D4 |
| REG1 | D1 | D1 | D1 | - | - | - | - | D5 | D5 |
| MEM0 | D2 | D2 | D2 | D2 | - | - | - | - | - |
| MEM1 | - | D3 | D3 | D3 | D3 | - | - | - | - |
| MEM2 | - | - | D4 | D4 | D4 | D4 | - | - | - |
| MEM3 | - | - | - | - | - | - | - | - | D6 |
| MEM4 | - | - | - | - | - | - | - | - | - |
| STATE | MEMSTART | MEMGENERAL | MEMGENERAL | BYPASSREG1 | BYPASSREG1 | BYPASSREG1 | REG0FULL | REG1FULL | MEMSTART |
| READ POINTER | MEM0 | MEM0 | MEM0+ | MEM1+ | MEM2+ | MEM3 | MEM3 | MEM3 | MEM3 |
| WRITE POINTER | MEM1+ | MEM2+ | MEM3 | MEM3 | MEM3 | MEM3 | MEM3 | MEM3+ | MEM4 |

FIG. 4B

| CLOCK CYCLE | 1 | 2 | 3 | 4 | 5 | 6 | 7 | 8 |
|---|---|---|---|---|---|---|---|---|
| READ | R | - | - | R | R | R | - | - |
| WRITE | - | W | W | W | W | W | W | - |
| DATA_IN | - | D2 | D3 | D4 | D5 | D6 | D7 | - |
| DATA_OUT | D0 | D1 | D1 | D1 | D2 | D3 | D4 | D4 |
| REG0 | D0 | D1 | D1 | D1 | D2 | D3 | D4 | D4 |
| REG1 | D1 | - | D2 | D2 | - | - | - | D5 |
| MEM0 | - | - | - | D3 | D3 | - | - | - |
| MEM1 | - | - | - | - | D4 | D4 | - | - |
| MEM2 | - | - | - | - | - | D5 | D5 | - |
| MEM3 | - | - | - | - | - | - | D6 | D6 |
| MEM4 | - | - | - | - | - | - | - | D7 |
| MEM5 | - | - | - | - | - | - | - | - |
| STATE | REG1FULL | REG0FULL | REG1FULL | MEMSTART | BYPASSREG1 | BYPASSREG1 | BYPASSREG1 | MEMGENERAL |
| READ POINTER | MEM0 | MEM0 | MEM0 | MEM0+ | MEM1+ | MEM2+ | MEM3 | MEM3 |
| WRITE POINTER | MEM0 | MEM0 | MEM0+ | MEM1+ | MEM2+ | MEM3+ | MEM4+ | MEM5 |

HIGH SPEED MEMORY-BASED BUFFER AND SYSTEM AND METHOD FOR USE THEREOF

BACKGROUND OF THE INVENTION

1. Field of the Invention

This invention relates to electronic devices, and more particularly to a high-speed memory-based buffer, and system and method for use thereof.

2. Description of the Related Art

Semiconductor processing has reached the level of placing tens of millions of transistors on a single integrated circuit or monolithic substrate, also known as a chip. The drive towards miniaturization is evident from recent forecasts from chipmakers towards shrinking transistor size from 0.25 micron down to 0.18 micron and beyond in the next decade. It is anticipated that this trend towards increased miniaturization will continue. This drive towards integration of electronic devices on increasingly complex chips requires increasingly compact designs even for relatively simple electronic devices. A companion concern to size is power consumption, as a high power device compacted into a smaller area may cause heating problems on the chip, as well as the possibility of actually melting the chip during operation.

Hardware buffers are devices that receive bits, store the bits temporarily, and then provide the bits upon request thereof. Buffers are often shared by a number of other devices that operate at different speeds or with different sets of priorities. The buffer allows faster devices to operate on the data stream without being held up by slower devices. Buffers are often categorized by the order in which the buffer provides data as compared to the order in which the data are stored. Examples of buffers include first in, first out buffers, also known as FIFOs; last in, first out buffers, as known as LIFOs or stacks, as well as queues, reorder buffers, reservation stations; etc. Another important factor is the size of the buffer, including the depth (i.e. the number of different data entries which can be stored concurrently) as well as the width (i.e. the number of bits that can be comprised in a single data entry).

Hardware buffers are often comprised of memory cells or registers. Memory cells may be comprised of any type of memory, including random access memory (RAM) in any of its varieties. Some memory types are fast on the write-in to read-out turnaround, having high power consumption and a large footprint, i.e. they require a large number of basic components and therefore a large area of semiconductor on a wafer. Other memory types have low power consumption and take up little space but are relatively slow. Registers usually fall into the same category as fast memory. When a buffer is comprised of registers or fast memory, the depth and width of the buffer is severely constrained due to the power consumption and footprint. When a buffer is comprised of slow memory, the speed of the buffer is severely constrained.

It would be desirable to have a buffer with a small footprint on the chip and low power consumption, yet has a rapid turnaround time for data entries written into it. Preferably, the turnaround time should have no latency, that is, data entries should be accepted into the buffer on each clock cycle until the buffer can no longer accept data entries and data entries should be available to be read out on each clock cycle until the buffer is empty. The buffer should also be relatively deep and wide as a function of the footprint and power consumption.

SUMMARY OF THE INVENTION

The problems outlined above are in large part solved by a system and method for buffering data entries using a memory and one or more registers, where control logic controls the operations of the memory and the registers. The memory may provide for relatively deep and wide storage of data entries, while minimizing footprint and power consumption. The registers may ensure that a data entry may be written in and/or read out on each clock cycle.

In one embodiment, a buffer configured to store a plurality of data entries comprises a memory, one or more registers coupled between an output of the memory and an output of the buffer, and control logic coupled to the registers and to the memory. The memory and each of the registers are configured to store data entries in data entry storage locations. The control logic is configured to control the operations of the buffer. The combination of memory with the one or more registers coupled between an output of the memory and an output of the buffer may advantageously result in a small footprint and low power consumption. The speed of the registers is added to the high depth and width to size ratio of the memory.

In another embodiment, the number of registers in the buffer is determined number of clock cycles of read latency of the memory. An alternative description is that the number of registers in the buffer is determined by the number of clock cycles between the clock cycle when a data entry is requested from the memory and the clock cycle when the data entry is available at the output of the memory. The number of registers may be set to optimize the speed gain from the use of registers, while minimizing the size and power consumption to depth and width ratio. The memory preferably provides the majority of the data entry storage locations.

In various embodiments, the buffer may be configured as a FIFO buffer or as a LIFO buffer. In one embodiment, the buffer is configured to operate as either a FIFO buffer or a LIFO buffer according to a configuration bit which is set in the control logic.

A method is likewise contemplated, operating within a buffer including a memory and one or more registers chained from the output of the memory. The method comprises reading a first data entry out of the memory and into an output register, the buffer receiving a read request, and providing the first data entry from the output register in response to the buffer receiving the read request. The method may advantageously use the speed of the registers coupled with the depth of the memory, all within a small footprint with relatively low power consumption. The method may further include reading a second data entry out of the memory and into the output register in response to providing the first data entry from the output register. It is noted that this further embodiment primes the output register in preparation for an additional read request during a following clock cycle.

In one embodiment, the method operates in a buffer including at least two registers, the output register, and an intermediate register coupled between the memory and the output register. The method then may further comprise reading a second data entry out of the memory and into the output register in response to providing the first data entry from the output register. In this embodiment, the method further reads a third data entry out of the memory and into the intermediate register after reading the second data entry out of the memory and into the output register.

A system is further contemplated, comprising, in one embodiment, a plurality of buffers coupled between one or more output ports and a plurality of input ports. The output ports are coupled to receive data from the input ports. The buffers may be of any embodiment described herein, but are preferably FIFO buffers, with each of the buffers configured to accept data from a respective input port. The control logic of each buffer is configured to output an empty control signal when the buffer is empty of data entries. Input multiplexers are coupled to each of the input ports and to an output of the respective buffer. The empty control signal from the respective buffer selects between data from the respective input port and the respective buffer. An output multiplexer is coupled to receive data from the input multiplexers and to provide output data to a respective output port. The depth of the buffers may advantageously provide for better buffering of data in the system without using unnecessary space or power.

BRIEF DESCRIPTION OF THE DRAWINGS

Other objects and advantages of the invention will become apparent upon reading the following detailed description and upon reference to the accompanying drawings in which:

FIGS. 4A, 4B, and 4C are timing diagrams illustrating various operations of the FIFO buffer of FIG. 2 as controlled by the state machine of FIG. 3;

Figure 1:
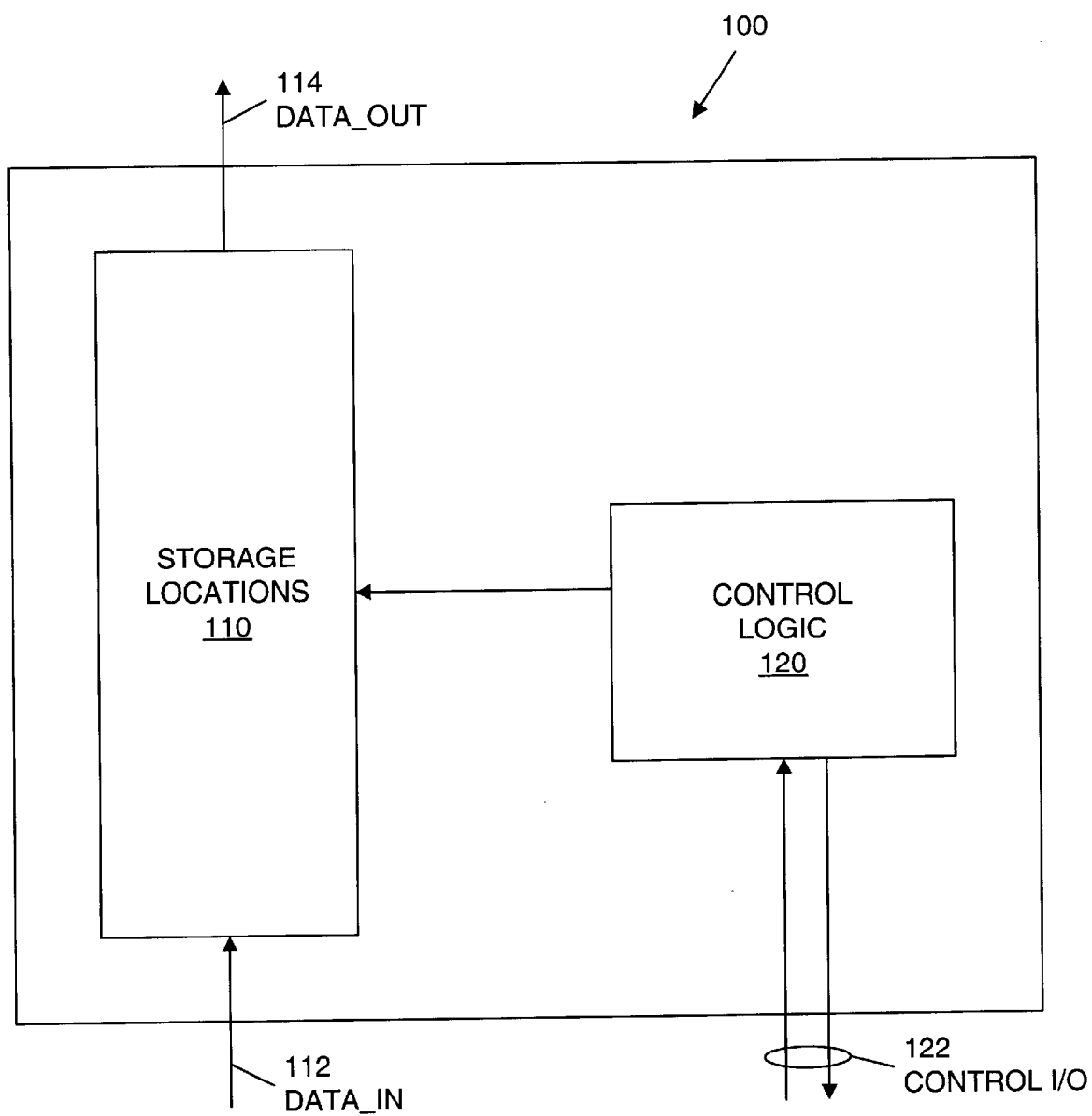
FIG. 1 is a block diagram of an embodiment of a buffer using control logic to control the operations of the buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning to FIG. 1, a block diagram of an embodiment of a buffer 100 using control logic 120 to control the operations of the buffer 100 is illustrated. Data entries are written into the buffer 100 on the $DATA_{13}IN$ line 112. Data entries written into the buffer 100 are stored in storage locations 110. Control logic 120 sends and receives control input/output (I/O) signals 122. The control logic 120 also outputs control signals to the storage locations 110. Data entries are read out of the buffer 100 on the $DATA_{13}OUT$ line 114.

The storage locations 110 may include memory, registers, or other storage elements that operate to accept, maintain, and yield data entries to read requests. Control logic 120 includes one or more combinatorial logic circuits and/or state machines, which operate upon one or more input signals, such as those included in the control I/O 122, to produce one or more output control signals. The output control signals may be used to control various other devices, such as the storage locations 110, as shown. It is noted that the buffer 100 receives and operates according to a clock signal that is not shown.

FIFO Buffer

Figure 2:
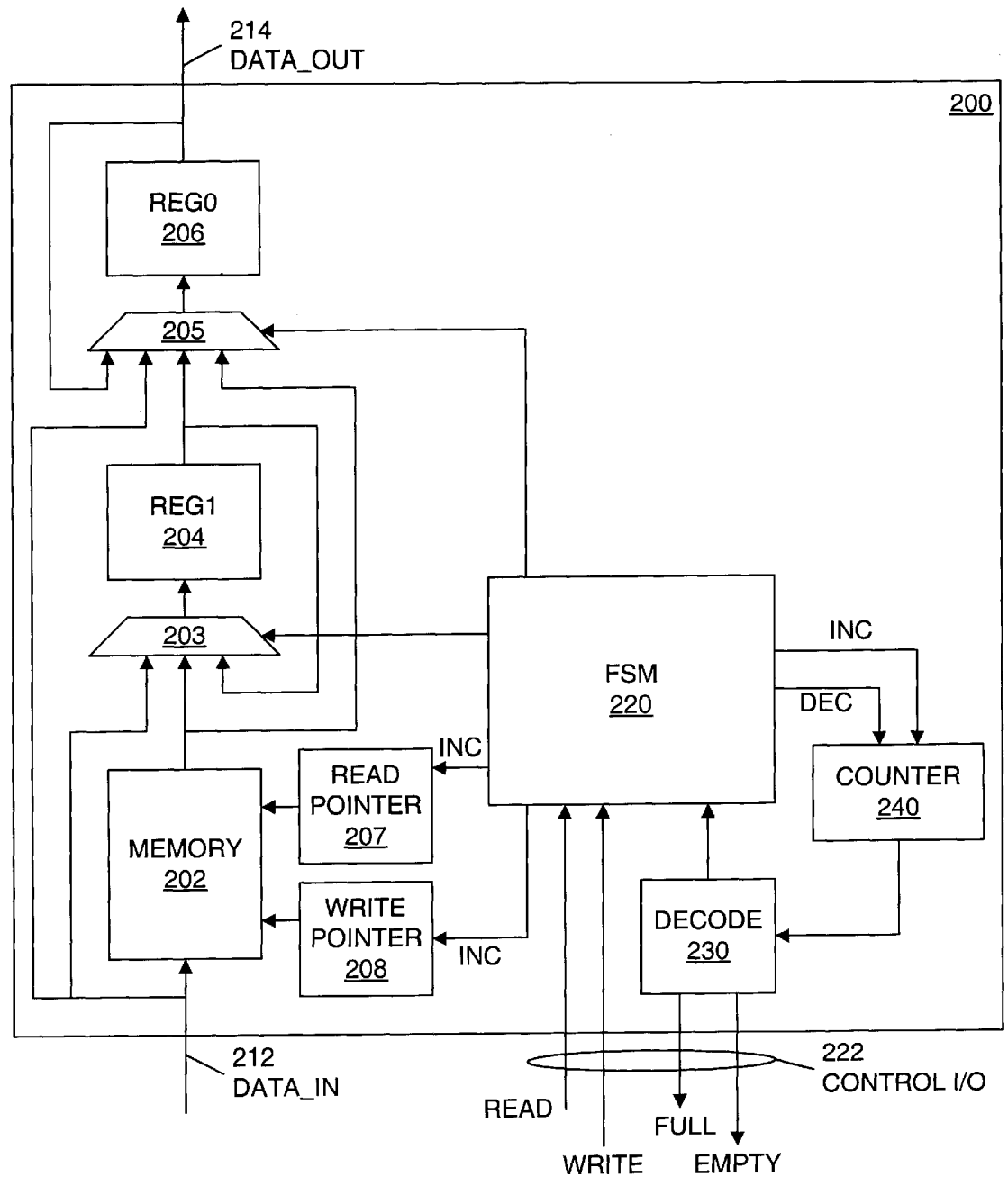
FIG. 2 is a block diagram of an embodiment of the buffer of FIG. 1 configured as a first in, first out (FIFO) buffer, with both memory and registers as storage locations.

Turning now to FIG. 2, a block diagram of an embodiment of the buffer 100 of FIG. 1 configured as a first in, first out (FIFO) buffer 200, with both memory 202 and registers 204 and 206 as storage locations 110 and a finite state machine 220 included in the control logic 120. Data entries are written into the FIFO buffer 200 on the $DATA_{13}IN$ line 212. Data entries that are written into the buffer 200 are stored in either the memory 202, register REG1 204, or register REG0 206. Data entries written into the FIFO buffer 200 are input to the memory 202 as well as the register REG1 204 and the register REG0 206. As shown, the inputs are first put through multiplexers 203 and 205, controlled by the state machine 220. The output of the memory 202 is input to both multiplexers 203 and 205. The output of each register REG1 204 and REG0 206 is fed back to the multiplexer 203 or 205 that feeds the respective register REG1 204 or REG0 206. The data entries are read out of the FIFO buffer 200 on the $DATA_{13}OUT$ line 214.

State machine 220 sends and receives control input/output (I/O) signals 222, including, as shown, a READ signal, a WRITE signal, a FULL signal, and an EMPTY signal. The READ and WRITE signals are used to read and write, respectively, from the FIFO buffer 200. The FULL and EMPTY signals are output to allow an external device to know when the FIFO buffer 200 is full or empty of data entries. The state machine 220 also outputs control signals to the memory 202, including incrementing the read pointer 207 and the write pointer 208. As noted above, the state machine 220 outputs control signals to the multiplexers 203 and 205, including selecting which input to a respective multiplexer 203 or 205 is output by the respective multiplexer 203 or 205. The state machine 220 increments and decrements one or more counters 240 to keep track of how many data entries are stored in the FIFO buffer 200, either in the memory 202 or the registers REG1 204 and/or REG0 206. A decode unit 230 accepts the output of the counters 240 and provides the state machine 220 with the count of the data entries as well as outputting the FULL and EMPTY signals.

The general operation of the FIFO buffer 200, as illustrated, may be broadly summarized as follows. A data entry on the $DATA_{13}IN$ line 212 to the FIFO buffer 200 is input to the memory 202, the register REG1 204, and the register REG0 206. The data entry is stored in register REG0 206 if it is empty. If register REG0 206 is full, the data entry is stored in register REG1 204. If register REG1 204 is also full, the data entry is stored in the memory 202 until it is full. During normal operation, the FIFO buffer 200 will only write in a new data entry when the FULL signal is asserted if the FIFO buffer is also reading out an existing data entry stored in the FIFO buffer 200.

The registers REG0 206 and REG1 204 allow the FIFO buffer 200 to have low latency between read and write cycles. The FIFO buffer 200 writes an incoming data entry into the registers 204 or 206 before filling the memory 202. Thus, the FIFO buffer 200 may provide data entries from the registers 204 and/or 206 on the immediately following clock cycle. The memory 202 provides additional data entry storage, albeit in a slower storage space.

The memory 202 fills the registers 204 and 206 to maintain a low latency. As the memory 202 requires multiple clock cycles to read out a data entry stored in the memory 202, the memory starts a memory read cycle in advance of the clock cycle in which the FIFO buffer will need to read out the data entry from the register REG0 206. Thus, the memory 202 provides deep storage and the registers 204 and 206 provide ready access to the next data entry.

Data entries are read out of the FIFO buffer 200 from the register REG0 206. The state machine 220 is configured to keep register REG0 206 filled from the register REG1 204, if possible. Data entries stored in the memory 202 may also be used to keep register REG0 206 filled, as will be seen below with respect to the operation of the state machine 220 in FIG. 3 and the timing diagrams of FIGS. 4A, 4B, and 4C.

In a preferred embodiment, the memory 202 is comprised of synchronous random access memory (RAM), or an asynchronous RAM without an exit flop. In this embodiment, the register REG1 204 latches each data output to it by the memory 202. It is noted that the memory 202 may also comprise content addressable memory (CAM) or another memory type as desired. It is also noted that the memory 202 may be addressed, instead of using read pointer 207 and write pointer 208, as desired. In a preferred embodiment, the FIFO buffer 200 is implemented inside an application specific integrated circuit (ASIC) as part of a system that includes the buffering between input and output ports as shown below in FIG. 7.

State Machine in the Control Logic

Figure 3:
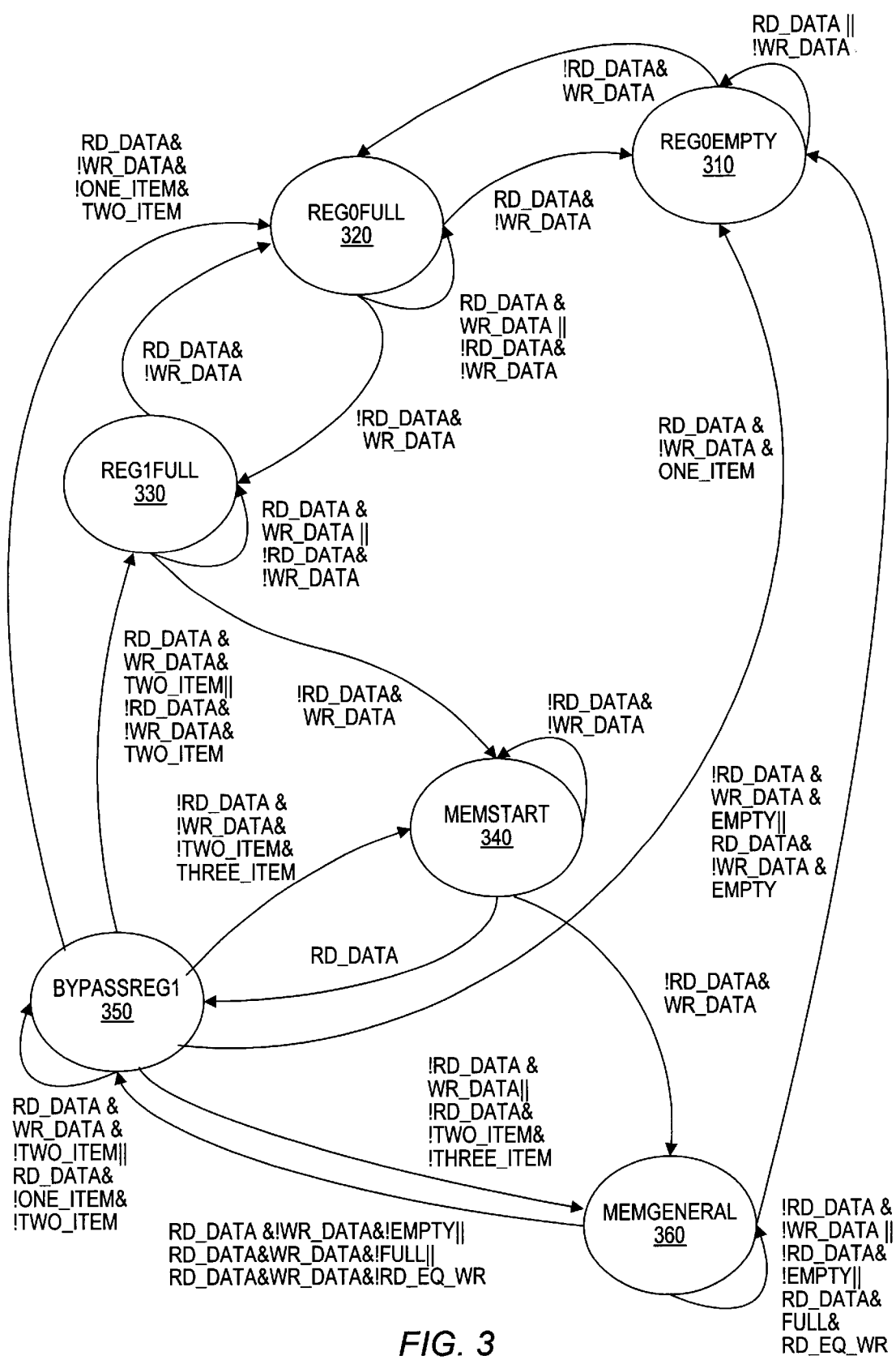
FIG. 3 is an embodiment of a state machine that controls the operation of the FIFO buffer of FIG. 2.

Turning now to FIG. 3, an embodiment of the state machine 220 that controls the operation of the FIFO buffer 200 of FIG. 2 is shown. The states of the state machine 220 include the following. The REG0EMPTY state is indicated when register REG0 is empty, along with the remainder of the FIFO buffer 200. The REG0FULL state is indicated when register REG0 is filled, but register REG1 is empty. The REG1FULL state indicates that both registers REG0 and REG1 are full. The MEMSTART state indicates that at least one data entry is stored in the memory. The BYPASSREG1 state indicates that the register REG1 is empty and that the memory will provide a data entry directly to the register REG0 unless register REG0 is still filled. The MEMGENERAL state indicates the memory includes a plurality of entries, while the system is not in a position to bypass the register REG1.

With the FIFO buffer 200 empty, the state machine starts in the REG0EMPTY state 310. The state machine loops in the REG0EMPTY state 310 while the FIFO buffer 200 is reading data or not writing data ($RD_{13}DATA$ || $!WR_{13}DATA$ is TRUE). When the FIFO buffer 200 is writing data and not reading data ($!RD_{13}DATA$ & $WR_{13}DATA$ is TRUE) in the REG0EMPTY state 310, the state machine transitions to the REG0FULL state 320.

The state machine loops in the REG0FULL state 320 while the FIFO buffer 200 is reading data while writing data ($RD_{13}DATA$ & $WR_{13}DATA$ is TRUE) or while the FIFO buffer 200 is not reading data and not writing data ($!RD_{13}DATA$ & $!WR_{13}DATA$ is TRUE). If the FIFO buffer 200 reads data but does not write data ($RD_{13}DATA$ & $!WR_{13}DATA$ is TRUE) in the REG0FULL state 320, the state machine transitions to the REG0EMPTY state 310. If the FIFO buffer 200 writes data but does not read data ($!RD_{13}DATA$ & $WR_{13}DATA$ is TRUE) in the REG0FULL state 320, the state machine transitions to the REG1FULL state 330.

The state machine loops in the REG1FULL state 330 while the FIFO buffer 200 reads data while writing data ($RD_{13}DATA$ & $WR_{13}DATA$ is TRUE) or while the FIFO buffer 200 neither reads data nor writes data ($!RD_{13}DATA$ & $!WR_{13}DATA$ is TRUE). If the FIFO buffer 200 reads data but does not write data ($RD_{13}DATA$ & $!WR_{13}DATA$ is TRUE) in the REG1FULL state 330, the state machine transitions to the REG0FULL state 320. If the FIFO buffer 200 writes data but does not read data ($!RD_{13}DATA$ & $WR_{13}DATA$ is TRUE) in the REG1FULL state 330, the state machine transitions to the MEMSTART state 340.

The state machine loops in the MEMSTART state 340 while the FIFO buffer 200 neither reads data nor writes data ($!RD_{13}DATA$ & $!WR_{13}DATA$ is TRUE). If the FIFO buffer 200 reads data ($RD_{13}DATA$ is TRUE) in the MEMSTART state 340, the state machine transitions to the BYPASSREG1 state 350. If the FIFO buffer 200 writes data but does not read data ($!RD_{13}DATA$ & $WR_{13}DATA$ is TRUE) in the MEMSTART state 340, the state machine transitions to the MEMGENERAL state 360.

The state machine loops in the BYPASSREG1 state 350 while the FIFO buffer 200 reads data while writing data and there are not exactly two data entries in the FIFO buffer 200 ($RD_{13}DATA$ & $WR_{13}DATA$ & $!TWO_{13}ITEM$ is TRUE) or while the FIFO buffer 200 reads data and there are not exactly one or two data entries in the FIFO buffer 200 ($RD_{13}DATA$ & $!ONE_{13}ITEM$ & $!TWO_{13}ITEM$ is TRUE). If the FIFO buffer 200 reads data but does not write data and there is not exactly one data entry in the FIFO buffer 200 but there are exactly two data entries ($RD_{13}DATA$ & $!WR_{13}DATA$ & $!ONE_{13}ITEM$ & $TWO_{13}ITEM$ is TRUE), the state machine transitions to the REG0FULL state 320. If the FIFO buffer 200 writes data but does not read data ($!RD_{13}DATA$ & $WR_{13}DATA$ is TRUE) or does not read data and there are not exactly two or three data entries in the FIFO buffer 200 while the state machine is in the BYPASSREG1 state 350, the state machine transitions to the MEMGENERAL state 360. If the FIFO buffer 200 reads data but does not write data and there is exactly one data entry in the FIFO buffer 200 ($RD_{13}DATA$ & $!WR_{13}DATA$ & $ONE_{13}ITEM$ is TRUE) while the state machine is in the BYPASSREG1 state 350, the state machine transitions to the REG0EMPTY state 310.

In the MEMGENERAL state 360, the state machine loops if the FIFO buffer 200 neither reads nor writes data ($!RD_{13}DATA$ & $!WR_{13}DATA$ is TRUE), or if the FIFO buffer 200 does not read data and is not completely empty of data entries ($!RD_{13}DATA$ & $!EMPTY$ is TRUE), or if the FIFO buffer 200 reads data while it is completely full of data entries and the read pointer and the write pointer point to the same data entry storage in the memory 202 ($RD_{13}DATA$ & $FULL$ & $RD_{13}EQ_{13}WR$ is TRUE). If the FIFO buffer 200 reads data but does not write data and is not completely empty of data entries ($RD_{13}DATA$ & $!WR\ DATA$ & $!EMPTY$ is TRUE), or if the FIFO buffer 200 reads data while writing data and is not completely full of data entries ($RD_{13}DATA$ & $WR_{13}DATA$ & $!FULL$ is TRUE), or if the FIFO buffer 200 reads data while writing data and the read pointer and the write pointer do not point to the same storage location in the memory 202 ($RD_{13}DATA$ & $WR_{13}DATA$ & $!RD_{13}EQ_{13}WR$ is TRUE), while the state machine is in the MEMGENERAL state 360, the state machine transitions to the BYPASSREG1 state 350. If the FIFO buffer 200 writes but does not read a data entry while empty ($!RD_{13}DATA$ & $WR_{13}DATA$ & $EMPTY$ is TRUE), or if the FIFO buffer 200 reads but does not write a data entry while empty ($RD_{13}DATA$ & $!WR_{13}DATA$ & $EMPTY$ is TRUE), in the MEMGENERAL state 360, the state machine transitions to the REG0EMPTY state 310.

Other implementations of state machine 220 are contemplated, as well as other forms of control logic 120 configured to operate buffer 200. Some or all of the conditions and/or transitions given for state machine 220 may be deleted, or new states, conditions and/or transitions may be added to achieve operation of the FIFO buffer 200.

Timing Diagrams

Turning now to FIGS. 4A, 4B, and 4C, exemplary timing diagrams 400A, 400B, and 400C, respectively, of the FIFO buffer 200 of FIG. 2 operating according to the state machine 220 of FIG. 3 are illustrated. In each case, the clock cycle designations for the diagram 400 are followed by the READ and WRITE signals of control I/O signals 222, the data that is on the $DATA_{13}IN$ 112 and $DATA_{13}OUT$ 114 lines, the contents of the registers REG0 206 and REG1 204, the contents of the memory 202, the state of the state machine 220, and the positions of the read and write pointers. Memory 20 includes storage locations referred to MEM0, MEM 1, etc. in FIGS. 4A–4C. The depth of the buffer is shown for illustrative purposes only. The memory may include additional data entry storage locations.

Each clock cycle is a snapshot in time, seen between the rising edges of the clock. Thus, the operations of the buffer transition on the rising edge, with the data moving, the state machine transitioning, and the read and write pointers transitioning on the next rising edge. It is noted that other clock conditions other than the rising edge are well known in the art. It is also noted that a number of registers other than two are contemplated, based on the characteristic latency of the memory used.

Timing diagram 400A, shown in FIG. 4A, includes eleven clock cycles. The buffer starts out empty, with no data stored in the registers REG0 or REG1 or the memory data entry storage locations MEM0, MEM1, etc. The read and write pointers both point to memory location MEM0. A write cycle is indicated with data entry D0 on the $DATA_{13}IN$ line. The state machine is in the REG0EMPTY state.

During clock cycle 2, data D0 is now stored in register REG0 and available on the $DATA_{13}OUT$ line. The state machine is in the REG0FULL state. As no data entries are in the memory, the read and write pointers continue to point to MEM0. Both a read and a write cycle are indicated, with data D1 presented on the $DATA_{13}IN$ line.

During clock cycle 3, data D0 has been read out of the buffer, and data D1 has taken its place in register REG0 and on the $DATA_{13}OUT$ line. Read and write cycles are again indicated with data D2 on the $DATA_{13}IN$ line. The state machine stays in the REG0FULL state.

In clock cycle 4, only a write cycle is indicated. Data D3 is presented on the $DATA_{13}IN$ line. Data D2 is now stored in the register REG0 and available to be latched on the $DATA_{13}OUT$ line. The state machine is currently in the REG0FULL state, and will transition to the REG1 FULL state due to the updating of register REG1 with data D3.

Both read and write cycles are indicated with data D4 on the $DATA_{13}IN$ line in clock cycle 5. Data D2 is stored in register REG0 and is latched from the $DATA_{13}OUT$ line. Data D3 is stored in the register REG1 and will be latched into register REG0. The state machine has transitioned into the REG1 FULL state and will remain in this state.

The state machine stays in the REG1FULL state with both a read and a write indicated in clock cycle 6. Data D5 is present on the $DATA_{13}IN$ line to be written in. Data D3 is in register REG0 to be read out on the $DATA_{13}OUT$ line. Data D4 is stored in the register REG1 and will be latched into the register REG0.

During clock cycle 7, a write cycle occurs with data D6 on the $DATA_{13}IN$ line. Data D4 is stored in register REG0 and available on the $DATA_{13}OUT$ line. Data D5 is stored in the register REG1. The state machine is in the REG1FULL state until the data D6 written in is stored in the memory at data entry storage location MEM0. The write pointer transitions on the write cycle into memory.

During clock cycle 8, a read cycle occurs with data D4 being read out of register REG0 on the $DATA_{13}OUT$ line. Data D5 is stored in the register REG1 and will be latched into register REG0 on the read cycle. Data D6 is stored in the memory at storage location MEM0. The state machine in the MEMSTART state. The read pointer transitions on the read cycle from memory, as data D6 is being read from memory to replace data D5 in register REG1. The write pointer is now pointing to MEM1.

As the memory cannot read out data D6 immediately, during clock cycle 9, register REG1 is empty, and the state machine transitions to the BYPASSREG1 state. Data D6 is still in the memory at storage location MEM0. Data D5 is stored in register REG0 and is available on the $DATA_{13}OUT$ line for the indicated read cycle. Both read and write pointers now point to storage location MEM1.

Another read cycle is indicated during clock cycle 10. Data D6 is now available in the register REG0 and on the $DATA_{13}OUT$ line. The state machine has transitioned to the REG0FULL state.

During clock cycle 11, the buffer is empty. The state machine is in the REG0EMPTY state, since data D6 has been read out of the buffer.

Turning now to FIG. 4B, timing diagram 400B includes nine clock cycles. In clock cycle 1, the state machine starts out in the MEMSTART state. Data D0 is stored in register REG0 and available to be read out on the $DATA_{13}OUT$ line. Data D1 is stored in register REG1, and data D2 is stored in the memory in storage location MEM0. The read pointer points to storage location MEM0. The write pointer points to storage location MEM1 and will transition on the indicated write cycle. Data D3 is presented on the $DATA_{13}IN$ line to be written in.

In clock cycle 2, the state machine has transitioned to the MEMGENERAL state. Data D0 is still stored in register REG0 and available to be read out on the $DATA_{13}OUT$ line. Data D1 is still stored in register REG1. Data D2 is still stored in the memory in storage location MEM0, while data D3 has been stored in the memory in storage location MEM1. The read pointer still points to storage location MEM0, but the write pointer now points to storage location MEM2 and will transition on the indicated write cycle. Data D4 is presented on the DATA IN line to be written in.

During clock cycle 3, a read cycle is indicated. Data D0, stored in register REG0, will be latched on the $DATA_{13}OUT$ line. Data D1, still stored in register REG1, will be written into register REG0. Data D2, stored in the memory in storage location MEM0, will be read from the memory. As with data D6 in clock cycle 8 of timing diagram 400A, data D2 will remain in the memory until the memory latency period has passed. Data D3 is still stored in the memory in storage location MEM1. Data D4 is now stored in the memory in storage location MEM2. The state machine remains in the MEMGENERAL state. The read pointer points to storage location MEM0, but will transition on the rising edge due to the read cycle. The write pointer now points to MEM3.

Register REG1 is empty during clock cycle 4. Data D1 is now stored in the register REG0 and available on the $DATA_{13}OUT$ line. Data entries D2, D3, and D4 are all stored in memory at storage locations MEM0, MEM1, and MEM2, respectively. Data entry D2 will be read from memory and bypass into register REG0 during clock cycle 5, since a read is being performed in clock cycle 4. The state machine has transitioned to the BYPASSREG1 state. The read pointer points to the MEM1 state and will transition on the read cycle. The write pointer still points to the MEM3 storage location. A memory read cycle for data D4 is also initiated during clock cycle 4 in anticipation of a read from the buffer during clock cycle 5.

Another read cycle occurs during clock cycle 5. Data D2 will be read from the register REG0 on the $DATA_{13}OUT$ line. Register REG1 remains empty, and the state machine remains in the BYPASSREG1 state. Data entries D3 and D4 remain stored in memory at storage locations MEM1 and MEM2, respectively, but data entry D3 will be written into the register REG0 during clock cycle 6. The read pointer points to the MEM2 storage location and will transition on the read. The write pointer still points to the MEM3 storage location.

Another read cycle occurs during clock cycle 6. Data D3 will be read from the register REG0 on the $DATA_{13}OUT$ line. Register REG1 remains empty, and the state machine remains in the BYPASSREG1 state. Data entry D4 remains stored in memory at storage location MEM2, but will be written into the register REG0 during clock cycle 7. Both read and write pointers now point to storage location MEM3.

During clock cycle 7, data D4 is stored in register REG0 and is available on the $DATA_{13}OUT$ line. A write cycle is indicated. Data D5 is present on the $DATA_{13}IN$ line and will be written directly into register REG1. The state machine has transitioned to the REG0FULL state.

A write cycle is indicated during clock cycle 8. Data D6 is presented on the $DATA_{13}IN$ line. Data D4 is stored in register REG0 and is available on the $DATA_{13}OUT$ line. Data D5 is stored in register REG1. The state machine has transitioned to the REG1FULL state. Both read and write pointers now point to storage location MEM3, and the write pointer will transition on the write. With both registers REG0 and REG1 full, data D6 will be written into the memory at storage location MEM3.

During clock cycle 9, no read or write activity occurs. Data D4 remains stored in register REG0 and available on the $DATA_{13}OUT$ line. Data D5 remains stored in register REG1, while data D6 is stored in the memory at storage location MEM3. The state machine has transitioned to the MEMSTART state. The read pointer points to the MEM3 storage location, while the write pointer points to the MEM4 storage location.

Turning now to FIG. 4C, timing diagram 400C includes eight clock cycles. In clock cycle 1, the state machine starts out in the REG1FULL state. Data D0 is stored in register REG0 and is available to be read out on the $DATA_{13}OUT$ line. Data D1 is stored in register REG1. The read and write pointers both point to storage location MEM0. A read cycle is indicated and the buffer will read out data D0.

During clock cycle 2, a write cycle is indicated. Data D2 is presented on the $DATA_{13}IN$ line. Data D1 is stored in register REG0 and available to be read out on the $DATA_{13}OUT$ line. The state machine has transitioned to the REG0FULL state.

During clock cycle 3, another write cycle is indicated. Data D3 is presented on the $DATA_{13}IN$ line. Data D1 is stored in register REG0 and available to be read out on the $DATA_{13}OUT$ line. Data D2 is stored in register REG1. The state machine has transitioned to the REG1FULL state. As data D3 will be written into memory, into storage location MEM0, the write pointer will transition to point to MEM1 on the write.

In clock cycle 4, both read and write cycles are indicated. Data D4 is presented on the $DATA_{13}IN$ line. Data D1 is stored in register REG0 and will be read out on the $DATA_{13}OUT$ line. Data D2 is stored in register REG1 and will latch into register REG0 as data D1 is read out. Data D3 is stored in the memory at storage location MEM0. A memory read for data D3 is started on the read request. The state machine has transitioned to the MEMSTART state. As both a memory read and a memory write are being performed, the read and write pointers will both transition from their current positions, pointing at storage locations MEM0 and MEM1, respectively.

In clock cycle 5, again both read and write cycles are indicated. Data D5 is presented on the $DATA_{13}IN$ line. Data D2 is stored in register REG0 and will be read out on the $DATA_{13}OUT$ line. Due to memory latency, no data is stored in register REG1. Data D3 is stored in the memory at storage location MEM0. Data D4 is stored in the memory at storage location MEM1. The memory read for data D3 will complete on the next rising edge, allowing data D3 to be latched into the then empty register REG0. The state machine has transitioned to the BYPASSREG1 state. A memory read for data D4 is started on the read request. As both a memory read and a memory write are being performed, the read and write pointers will both transition from their current positions, pointing at storage locations MEM1 and MEM2, respectively.

A third consecutive clock cycle with both read and write cycles occurs in clock cycle 6. Data D6 is presented on the $DATA_{13}IN$ line. Data D3 is stored in register REG0 and will be read out on the $DATA_{13}OUT$ line. Due to memory latency, no data is stored in register REG1. Data D4 is stored in the memory at storage location MEM1. Data D5 is stored in the memory at storage location MEM2. The memory read for data D4 will complete on the next rising edge, allowing data D4 to be latched into the then empty register REG0. The state machine remains in the BYPASSREG1 state. A memory read for data D5 is started on the read request. As both a memory read and a memory write are being performed, the read and write pointers will both transition from their current positions, pointing at storage locations MEM2 and MEM3, respectively.

During clock cycle 7, a write cycle is indicated. Data D7 is presented on the $DATA_{13}IN$ line. Data D4 is stored in register REG0 and available to be read out on the $DATA_{13}OUT$ line. Due to memory latency, no data is stored in register REG1. Data D5 is stored in the memory at storage location MEM2. Data D6 is stored in the memory at storage location MEM3. The state machine remains in the BYPASSREG1 state. The read pointer points at storage location MEM3. The write pointer points to storage location MEM4 and will transition on the write as data D7 is written into memory at to storage location MEM4.

During clock cycle 8, no I/O cycles are indicated. Data D4 is stored in register REG0 and available to be read out on the $DATA_{13}OUT$ line. Data D5 has been read out of the memory and is stored in register REG1. Data D6 and D7 are stored in memory at storage locations MEM3 and MEM4, respectively. The state machine has transitioned to the MEMGENERAL state. The read pointer points to data D6 in MEM3, while the write pointer points to storage location MEM5.

LIFO Buffer

Figure 5:
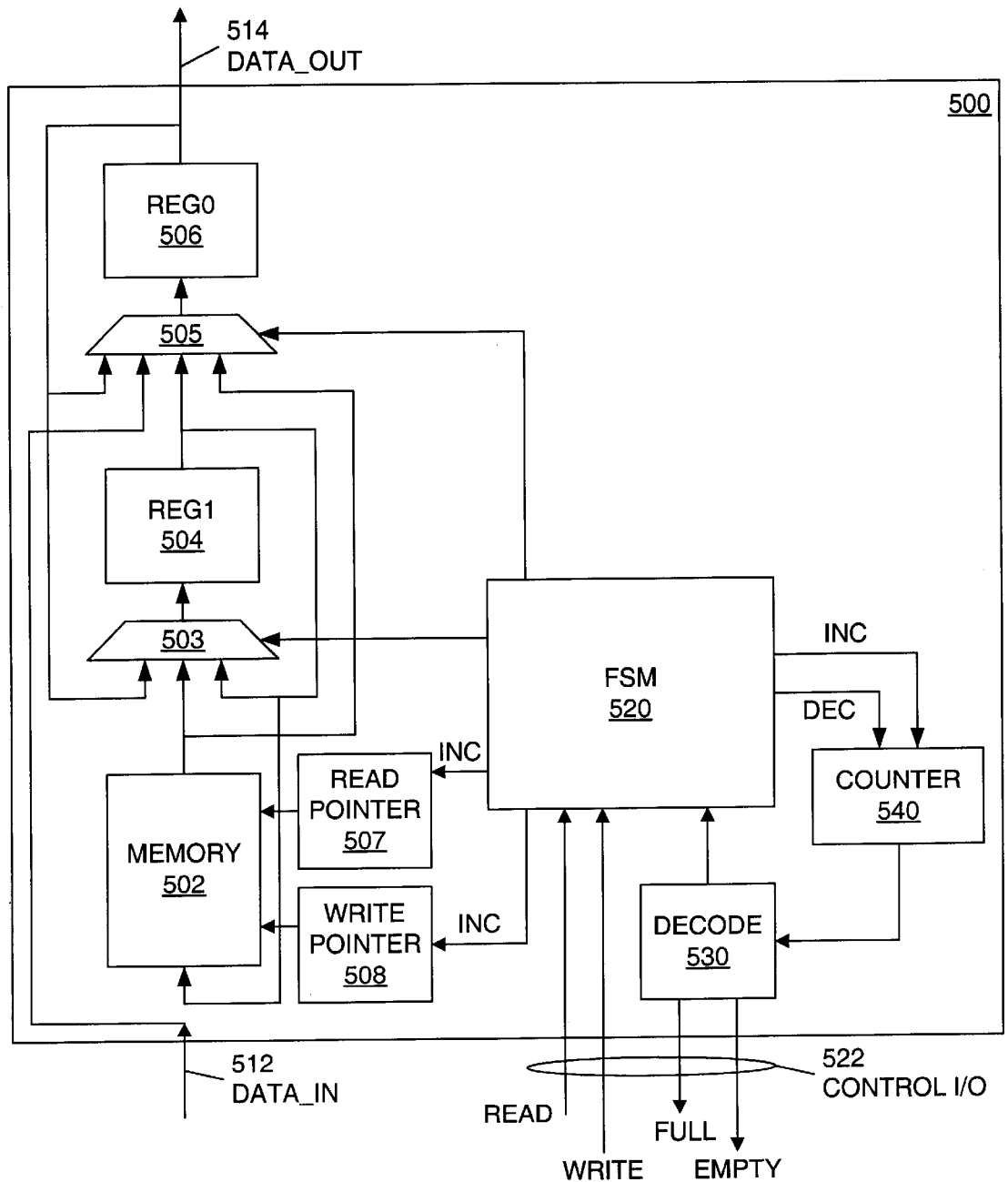
FIG. 5 is a block diagram of an embodiment of the buffer of FIG. 1 configured as a last in, first out (LIFO) buffer, with both memory and registers as storage locations.

Turning now to FIG. 5, a block diagram of another embodiment of the buffer 100 of FIG. 1 is shown. The buffer 100 is shown configured as a last in, first out (LIFO) buffer 500, with both memory 502 and registers 504 and 506 as storage locations 110 and a finite state machine 520 included in the control logic 120. Data entries are written into the LIFO buffer 500 on the $DATA_{13}IN$ line 512. Data entries that are written into the buffer 500 are stored in either the memory 502, register REG1 504, or register REG0 506. Data entries that are written into the FIFO buffer 500 are input to the register REG0 506. As shown, the inputs are first put through multiplexers 503 and 505, controlled by the state machine 520. The output of the memory 502 is input to both multiplexers 503 and 505. The output of each register REG1 504 and REG0 506 is fed back to the multiplexer 503 or 505 that feeds the respective register REG1 504 or REG0 506. The data entries are read out of the LIFO buffer 500 on the $DATA_{13}OUT$ line 514.

State machine 520 sends and receives control input/output (I/O) signals 522, including, as shown, a READ signal, a WRITE signal, a FULL signal, and an EMPTY signal. The READ and WRITE signals are used to read and write, respectively, from the LIFO buffer 500. The FULL and EMPTY signals are output to allow an external device to know when the LIFO buffer 500 is full or empty of data entries. The state machine 520 also outputs control signals to the memory 502, including incrementing the read pointer 507 and the write pointer 508. As noted above, the state machine 520 outputs control signals to the multiplexers 503 and 505, including selecting which input to a respective multiplexer 503 or 505 is output by the respective multiplexer 503 or 505. The state machine 520 increments and decrements one or more counters 540 to keep track of how many data entries are stored in the LIFO buffer 500, either in the memory 502 or the registers REG1 504 and REG0 506. A decode unit 530 accepts the output of the counters 540 and provides the state machine 520 with the count of the data entries as well as outputting the FULL and EMPTY signals.

The general operation of the LIFO buffer 500, as illustrated, may be broadly summarized as follows. A data entry on the $DATA_{13}IN$ line 512 to the LIFO buffer 500 is input to the register REG0 506. The data entry is stored in register REG0 506. If register REG0 506 was already full, the data entry previously stored in register REG0 506 is stored in register REG1 504. If register REG1 504 was also already full, the data entry stored in register REG1 504 is stored in the memory 502 until the memory 502 is full.

Data entries are read out of the LIFO buffer 500 from the register REG0 506. The state machine 520 is configured to keep register REG0 506 filled from the register REG1 504, if possible. Data entries stored in the memory 502 may also be used to keep register REG0 506 filled, in a similar fashion as seen above with respect to the operation of the state machine 220 in FIG. 3 and the timing diagrams of FIGS. 4A, 4B, and 4C, both with respect to the FIFO buffer 200.

It is noted that state machine 520 may differ from state machine 220 due to the differences in FIFO and LIFO operation. However, these differences may be accounted for according to the remainder of the disclosure. For example, the READ and WRITE pointers always move together in the LIFO buffer, once a data entry is stored in the memory. The READ pointer always points to the last entry written into memory, while the WRITE pointer always points to the immediately following empty entry, if one is available. Thus the condition where the READ and WRITE pointers point to the same data entry storage location ($RD_{13}EQ_{13}WR$) is only TRUE when the memory in the LIFO is either empty or full.

Dual-Use FIFO or LIFO Buffer

Figure 6:
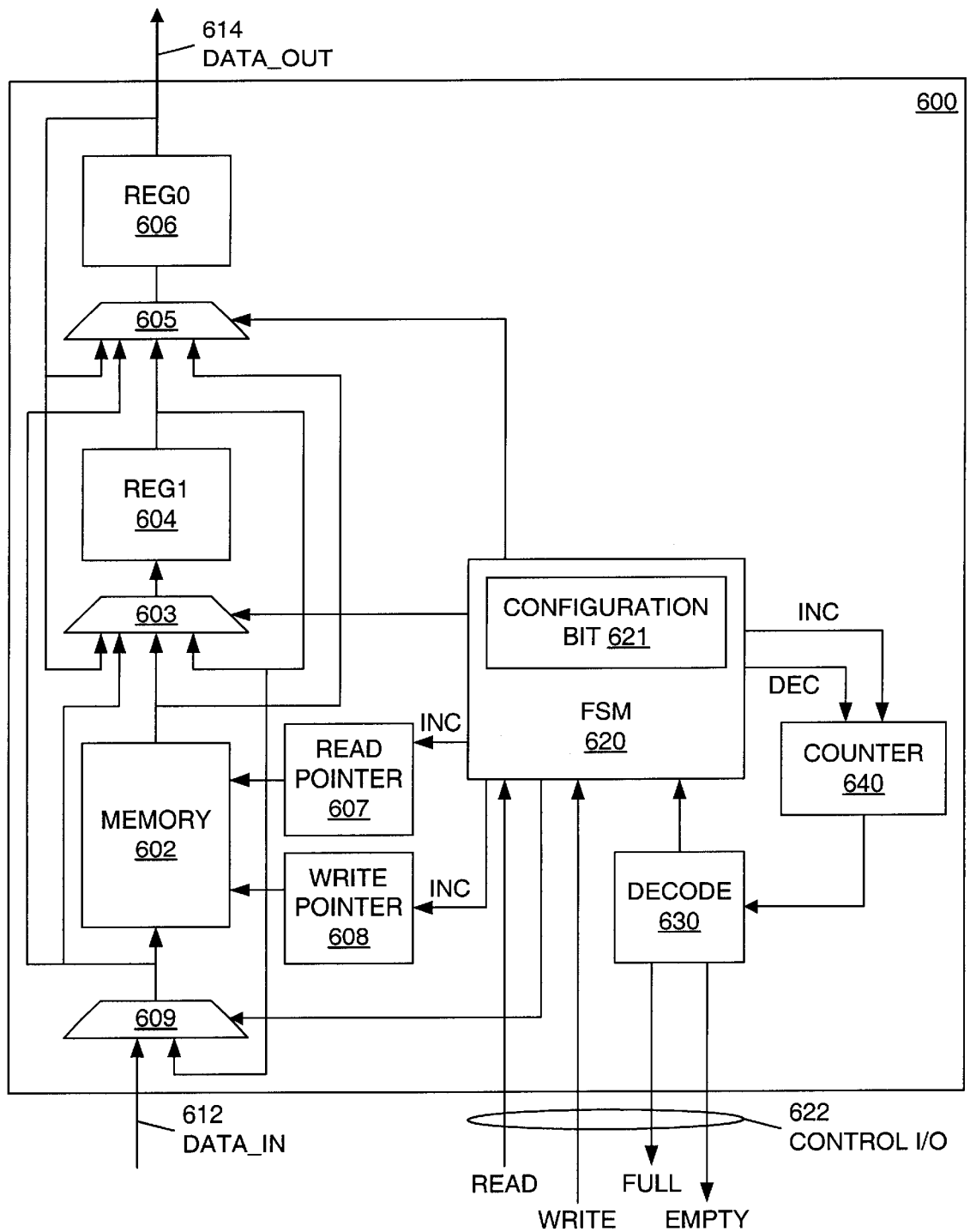
FIG. 6 is a block diagram of an embodiment of the buffer of FIG. 1 configurable as either a FIFO buffer or a LIFO buffer, with both memory and registers as storage locations.

Turning now to FIG. 6, a block diagram of an additional embodiment of the buffer 100 of FIG. 1 is shown which is dynamically configurable as a FIFO buffer 200 or as a LIFO buffer 500. Operation by the configurable buffer 600 as a FIFO buffer 200 or as a LIFO buffer 500 is determined by a configuration bit 621 in the control logic. The configuration bit may be set by strobing the READ and WRITE input control signals or by another write cycle mechanism, as desired.

Differences between the configurable buffer 600 and the FIFO buffer 200 and the LIFO buffer 500 will be highlighted here. State machine 620 sends and receives control input/output (I/O) signals 622, including, as shown, a READ signal, a WRITE signal, a FULL signal, and an EMPTY signal. The READ and WRITE signals are used to read and write, respectively, from the configurable buffer 600. The state machine 620 also outputs control signals to the memory 602, including incrementing the read pointer 607, the write pointer 608, and asserting the input selection control signal to multiplexer 609. The input selection control signal determines whether the memory 602 inputs the $DATA_{13}IN$ signal 612 or the register REG1 602 output signal from the multiplexer 609. As noted above, the state machine 620 also outputs control signals to the multiplexers 603 and 605. The state machine 640 also controls the counter 640 and the operation of the decode unit 630 as described above.

System for Buffering between Input and Output Ports

Figure 7:
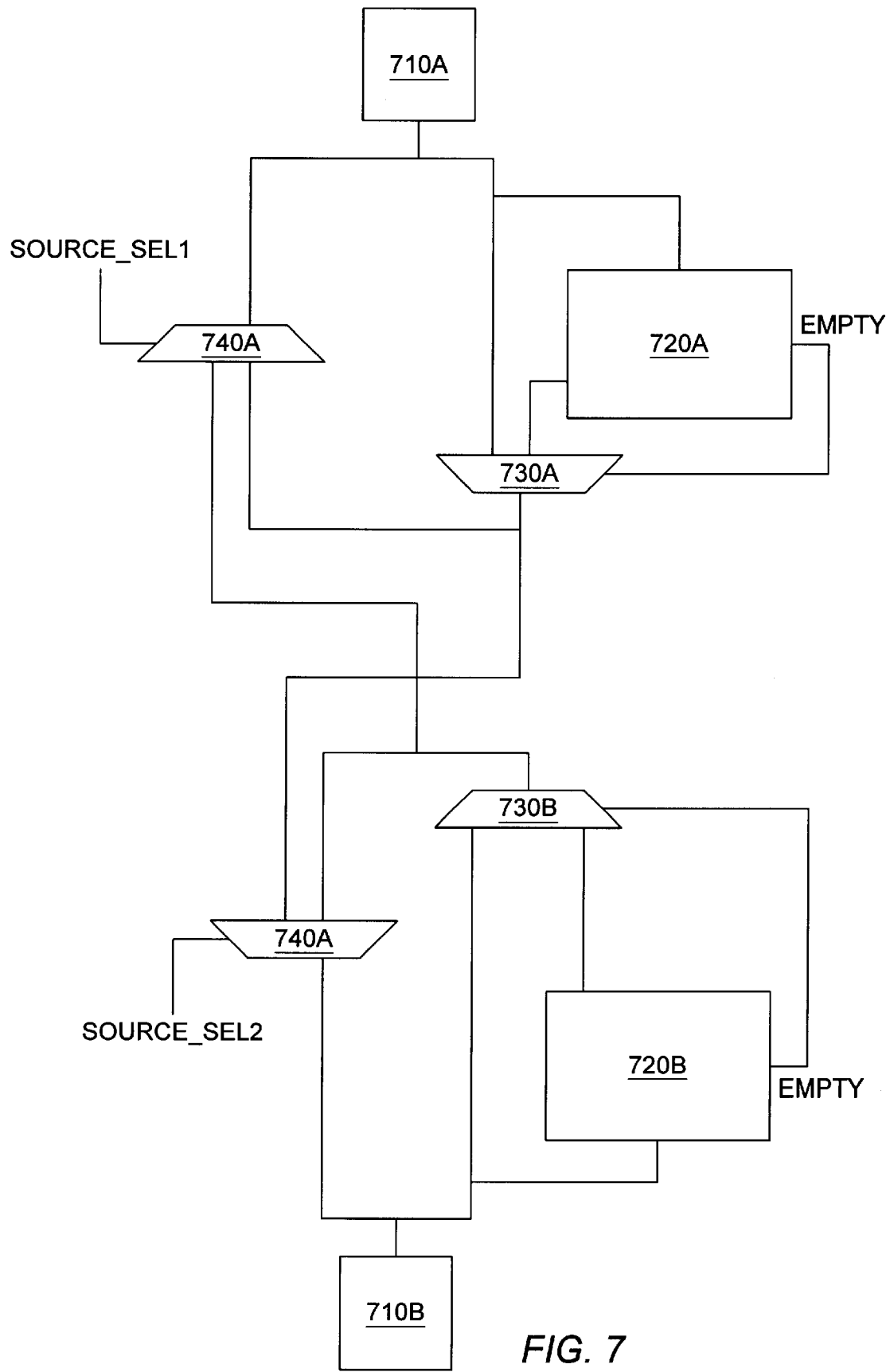
FIG. 7 is a block diagram of an embodiment of a system that uses a plurality of the buffers of FIG. 2 to route data between input and output ports.

Turning now to FIG. 7, a block diagram of a system including a plurality of buffers 100 to route data between input and output ports is illustrated. The buffers 720A, 720B are preferably similar to FIFO buffer 200, although LIFO buffer 500 or configurable buffer 600 may also be substituted. As shown, dual input/output (I/O) ports 710A and 710B input and output data. I/O ports 710A and/or 710B may also comprise input only ports or output only ports, as desired, with additional input and/or output ports included in the system. The use of dual input/output (I/O) ports is for simplicity only. In a preferred embodiment, ten dual I/O ports 710 are contemplated; each dual I/O port 710 being configured to route data similarly to that shown in FIG. 7.

Data input at an I/O port 710 are routed to FIFO buffer 720 and to a data multiplexer 730. The EMPTY signal from the FIFO buffer 720 controls the output of the data multiplexer 730. If the FIFO buffer 720 asserts the EMPTY signal, then the data multiplexer 730 outputs the data entry input at the I/O port 710, and the data entry at the I/O port 710 is not stored in the FIFO buffer 720. If the FIFO buffer 720 does not assert the EMPTY signal, then the data multiplexer 730 outputs the data entry output from the FIFO buffer 720, and the data entry at the I/O port 710 is stored in the FIFO buffer 720.

As shown, all data input at the I/O ports 710, either directly or buffered through the FIFO buffers 720 are routed to the output multiplexers 740. A source selection signal $SOURCE_{13}SEL\#$ is asserted to determine which input to the output multiplexer 740 is output to the I/O port 710.

It is noted that in the above-described embodiments, specific types of buffers 100 are illustrated. The specific choice of operation of the buffer 100, as FIFO buffer 200, LIFO buffer 500, or as configurable buffer 600 may vary in various embodiments. In certain preferred embodiments, buffer 100 is FIFO buffer 200. Similarly, the number of registers may vary form embodiment to embodiment. The number of registers is preferably optimized based on the latency of the memory. In a preferred embodiment, the buffer is configured to read or write a data entry for each clock cycle, without an intervening idle clock cycle. The number of registers required for this embodiment should allow the memory to fill the output buffer every clock cycle, as necessary.

Numerous variations and modifications will become apparent to those skilled in the art once the above disclosure is fully appreciated. It is intended that the following claims be interpreted to embrace all such variations and modifications.

What is claimed is:

1. A buffer configured to store a plurality of data entries, the buffer comprising:
    a memory including a plurality of data entry storage locations;
    a plurality of registers each configured to store one of the plurality of data entries, wherein the plurality of registers are coupled between an output of the memory and an output of the buffer, wherein the plurality of registers include a first register and a second register, wherein the inputs of the first register and the second register are coupled to receive the output of the memory, wherein the input to the first register is coupled to receive the output of the second register; and
    control logic coupled to the plurality of registers and to the memory, wherein the control logic is configured to control the operations of the buffer.

2. The buffer of claim 1, wherein the buffer is configured to read or write a data entry for each clock cycle, without an intervening idle clock cycle.

3. The buffer of claim 1, wherein the control logic further includes:
    a read pointer coupled to the memory, wherein the read pointer is configured to designate which of the plurality of data entry locations is next to be read;
    a write pointer coupled to the memory, wherein the write pointer is configured to designate which of the plurality of data entry locations is next to be written.

4. The buffer of claim 1, wherein each of the plurality of registers is further coupled to receive a data entry input to the memory.

5. The buffer of claim 1, wherein the output of the first register is the output of the buffer.

6. The buffer of claim 1, wherein a number of the plurality of registers corresponds to the number of clock cycles of read latency of the memory.

7. The buffer of claim 1, wherein each of the plurality of registers is coupled to receive its respective inputs through a multiplexer controlled by the control logic.

8. The buffer of claim 1, wherein the memory is a random access memory (RAM).

9. The buffer of claim 1, wherein the memory is a content addressable memory (CAM).

10. The buffer of claim 1, wherein said buffer is configured as a first in, first out (FIFO) buffer.

11. The buffer of claim 1, wherein said buffer is configured as a last in, first out (LIFO)buffer.

12. The buffer of claim 1, wherein said buffer is configured to operate as either a first in, first out (FIFO) buffer or a last in, first out (LIFO) buffer, as desired; and wherein said control logic further comprises:
    a configuration bit operable to configure said buffer as said FIFO buffer or as said LIFO buffer.

13. The buffer as recited in claim 1 wherein the control logic is configured, responsive to the first register being empty and the second register being empty, to read a first data entry from the memory for storage in the first register and a second data element for storage in the second register.

14. The buffer as recited in claim 1 wherein the control logic is configured, responsive to the first register being full and the second register being empty, to read a first data entry from the memory for storage in the second register.

15. The buffer as recited in claim 1 wherein, in response to outputting a first data entry from the first register, the control logic is configured to shift a second data entry stored in the second register into the first register and is further configured to read a third data entry from the memory for storage in the second register.

16. A buffer configured to store a plurality of data entries, the buffer comprising:
    a memory including a plurality of data entry storage locations;
    a plurality of clocked storage elements each configured to store one of the plurality of data entries, wherein the plurality of clocked storage elements are coupled between an output of the memory and an output of the buffer, wherein the plurality of clocked storage elements include a first clocked storage element and a second clocked storage element, wherein each of the first clocked storage element and the second clocked storage element are coupled to receive the output of the memory, and wherein the first clocked storage element is coupled to receive the output of the second clocked storage element; and
    control logic coupled to the one or more clocked storage elements and to the memory.

17. The buffer as recited in claim 16, wherein the plurality of clocked storage elements comprise a plurality of registers.

18. The buffer as recited in claim 16, wherein the buffer is configured to read or write a data entry for each clock cycle, without an intervening idle clock cycle.

19. The buffer as recited in claim 16, wherein each of the plurality of clocked storage elements is further coupled to receive a data entry input to the memory.

20. The buffer as recited in claim 16, wherein a number of the plurality of clocked storage elements corresponds to the number of clock cycles of read latency of the memory.

21. The buffer as recited in claim 16, wherein each of the plurality of clocked storage elements is coupled to receive its respective inputs through a multiplexer controlled by the control logic.

22. The buffer as recited in claim 16, wherein said buffer is configured as a first in, first out (FIFO) buffer.

23. The buffer as recited in claim 16, wherein said buffer is configured as a last in, first out (LIFO) buffer.

24. The buffer as recited in claim 16, wherein said buffer is configured to operate as either a first in, first out (FIFO) buffer or a last in, first out (LIFO) buffer, as desired; and wherein said control logic further comprises:
    a configuration bit operable to configure said buffer as said FIFO buffer or as said LIFO buffer.

25. The buffer as recited in claim 16 wherein the control logic is configured, responsive to the first clocked storage element being empty and the second clocked storage element being empty, to read a first data entry from the memory for storage in the first clocked storage element and a second data element for storage in the second clocked storage element.

26. The buffer as recited in claim 16 wherein the control logic is configured, responsive to the first clocked storage element being full and the second clocked storage element being empty, to read a first data entry from the memory for storage in the second clocked storage element.

27. The buffer as recited in claim 16 wherein, in response to outputting a first data entry from the first clocked storage element, the control logic is configured to shift a second data entry stored in the second clocked storage element into the first clocked storage element and is further configured to read a third data entry from the memory for storage in the second clocked storage element.

28. A method of buffering data through a buffer storing a plurality of data entries, the buffer including a memory having a plurality of data entry storage locations and one or more registers chained from the output of the memory, each register configured to store one of the plurality of data entries, wherein the one or more registers includes an intermediate register coupled between said memory and an output register, the method comprising:

reading a first data entry out of the memory and into said output register of the one or more registers;

the buffer receiving a read request;

providing said first data entry from said output register in response to the buffer receiving said read request;

reading a second data entry out of the memory and into said output register in response to said providing said first data entry from said output register; and reading a third data entry out of the memory and into said intermediate register after said reading said second data entry out of the memory and into said output register.

29. A method of buffering data through a buffer storing a plurality of data entries, the buffer including a memory having a plurality of data entry storage locations and one or more registers chained from the output of the memory, each register configured to store one of the plurality of data entries, wherein the one or more registers includes an intermediate register coupled between said memory and an output register, wherein an input to the buffer is coupled to an input to the intermediate register, the method comprising:

reading a first data entry out of the memory and into said output register of the one or more registers;

the buffer receiving a read request;

providing said first data entry from said output register in response to the buffer receiving said read request;

the buffer receiving a write request; and writing a second data entry into said intermediate register in response to the buffer receiving the write request.

30. A system for buffering data, the system comprising:

means for storing a plurality of data entries;

a plurality of means for storing single data entries, wherein the plurality of means for storing single data entries are chained from the output of the means for storing the plurality of data entries, the plurality of means for storing single data entries includes a first means and a second means, wherein the output of the means for storing a plurality of data entries is coupled to the inputs of the first means and the second means, wherein the output of the second means is coupled to the input to the first means;

means for reading a first data entry out of the means for storing the plurality of data entries and into an output one of the plurality of means for storing single data entries;

means for receiving a read request; and means for providing the first data entry from the output one of the plurality of means for storing single data entries in response to the means for receiving the read request receiving the read request.

31. A system for routing data between data ports, comprising:

one or more output ports coupled to receive data from a plurality of input ports;

a plurality of buffers coupled to the plurality of input ports, wherein each of the plurality of buffers are configured to accept data from a respective input port, wherein each of said plurality of buffers comprises:

a memory including a plurality of data entry storage locations;

a plurality of registers each coupled to store one of a plurality of data entries, wherein the plurality of registers are coupled between an output of the memory and an output of the buffer, wherein the plurality of registers include a first register and a second register, wherein the inputs of the first register and the second register are coupled to receive the output of the memory, wherein the input to the first register is coupled to receive the output of the second register; and control logic coupled to the plurality of registers and to the memory, wherein the control logic is configured to control the operations of the buffer, wherein the control logic is configured to output an empty control signal when said buffer is empty of data entries;

a plurality of input multiplexers coupled to the plurality of input ports, wherein each of the plurality of input multiplexers is further coupled to receive an output of a respective one of the plurality of buffers, wherein said empty control signal from the respective one of the buffers selects between data from the respective input port and the respective buffer; and one or more output multiplexers coupled to receive data from the plurality of input multiplexers, wherein each of the one or more output multiplexers is configured to provide output data to a respective one of the one or more output ports.

* * * * *

UNITED STATES PATENT AND TRADEMARK OFFICE
CERTIFICATE OF CORRECTION

PATENT NO.     : 6,286,076 B1
DATED          : September 4, 2001
INVENTOR(S)    : Jurgen M. Schulz It is certified that error appears in the above-identified patent and that said Letters Patent is hereby corrected as shown below:

<u>Title page,</u>
Item [75], Inventor, please delete "Schultz" and insert -- Schulz -- in place thereof Signed and Sealed this Third Day of June, 2003

JAMES E. ROGAN
*Director of the United States Patent and Trademark Office*